(12) United States Patent
Watkins

(10) Patent No.: US 6,807,805 B2
(45) Date of Patent: Oct. 26, 2004

(54) HYPERGOLIC FUEL SYSTEM

(75) Inventor: William B. Watkins, Tequesta, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/386,308

(22) Filed: Mar. 11, 2003

(65) Prior Publication Data

US 2004/0177604 A1 Sep. 16, 2004

(51) Int. Cl.$^7$ .................................................. F02K 9/42
(52) U.S. Cl. ........................................ 60/211; 60/257
(58) Field of Search ........................... 60/205, 211, 218, 60/220, 257

(56) References Cited

U.S. PATENT DOCUMENTS

| 3,488,962 A | | 1/1970 | McCormick |
| 5,117,627 A | * | 6/1992 | Runavot .................. 60/218 |
| 6,212,876 B1 | * | 4/2001 | Gregory et al. .......... 60/201 |

* cited by examiner

Primary Examiner—Ehud Gartenberg
(74) Attorney, Agent, or Firm—Bachman & LaPointe, P.C.

(57) ABSTRACT

A hypergolic fuel system comprises hydrogen peroxide, silane and a liquid fuel. The hypergolic fuel system is employed in a method for producing thrust, for example in a rocket, by contacting hydrogen peroxide with silane to obtain initial ignition and thereafter feeding a liquid fuel for combustion.

10 Claims, 1 Drawing Sheet

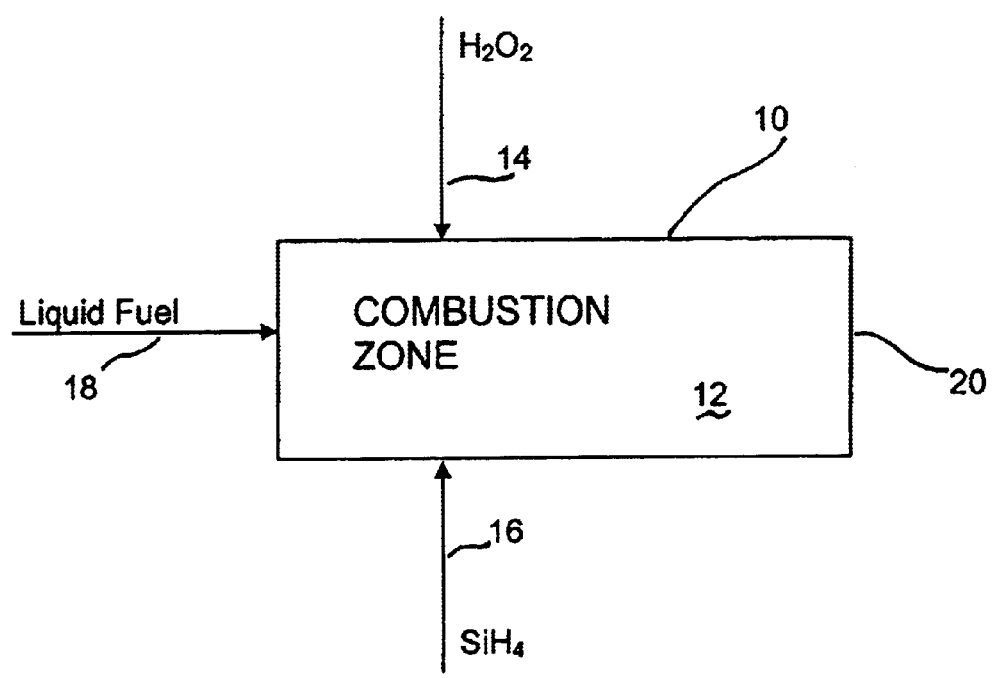

HYPERGOLIC FUEL SYSTEM

BACKGROUND OF THE INVENTION

The present invention relates to a hypergolic fuel system and a method for producing thrust employing the hypergolic fuel sys tem.

It is known in the prior art that hydrogen peroxide is known propellant for use in rocket engines. In accordance with the prior art, hydrogen peroxide is contacted with a decomposition catalyst which accelerates decomposition of the hydrogen peroxide. The resulting gases are exhausted to provide the thrust. Such a method and decomposition catalyst are disclosed in U.S. Pat. No. 3,488,962.

The employment of the catalytic bed, while effective, does result in a significant increase in cost in prior art methods. Naturally, it would be highly desirable to provide a hypergolic fuel system which does not require the use of expensive decomposition catalysts.

Accordingly, it is the principal object of the present invention to develop a liquid based fuel system which is hypergolic with hydrogen peroxide.

It is a further object of the present invention to provide a hypergolic agent which is used in combination with hydrogen peroxide to obtain reliable, dependable and cost effective ignition of a liquid fuel.

SUMMARY OF THE INVENTION

The foregoing objects are achieved by way of the present invention by providing a hypergolic fuel system comprising hydrogen peroxide ($H_2O_2$), silane ($SiH_4$) and a liquid fuel. A method for producing thrust comprises contacting the hydrogen peroxide with silane to decompose the hydrogen peroxide to form resulting gases which are contacted with a liquid fuel for igniting the liquid fuel.

Further objects and advantages of the present invention will be made clear from the following detailed description.

BRIEF DESCRIPTION OF THE DRAWING

The FIGURE is a schematic illustrating the present invention.

DETAILED DESCRIPTION

The present invention will be described with reference to a hypergolic fuel system used for rocket propulsion.

With reference to the FIGURE, a rocket chamber 10 is schematically illustrated and comprises a combustion zone 12. The combustion zone is provided with a plurality of inlets, for example 3 inlets, 14, 16 and 18, for feeding to the combustion zone the components of the hypergolic fuel system. An exhaust outlet port 20 communicates with the combustion zone for exhausting decomposition gases created in the combustion zone (in a manner to be described hereinbelow) to provide thrust for a rocket.

In accordance with the present invention, the components of the hypergolic fuel system comprise hydrogen peroxide ($H_2O_2$), silane ($SiH_4$) and a liquid fuel, preferably kerosene.

In accordance with the present invention, a method for producing thrust in a rocket engine comprises initially contacting hydrogen peroxide with silane in the combustion zone wherein the hydrogen peroxide in the presence of silane ignites upon decomposition into gases. This reaction takes place at room temperature. In order to provide effective ignition, the ratio of hydrogen peroxide to silane fed to the combustion chamber is between 1 and 9, preferably between 3 and 6. The hydrogen peroxide and silane are fed to the combustion zone under positive pressure so as to prevent backflow.

As noted above, upon contact in the combustion zone, the hydrogen and silane decompose and ignite. Upon ignition, a liquid fuel is fed to the combustion zone and combusted therein so as to provide thrust as exhaust cases exit combustion zone 12 of the rocket chamber 10 through the exhaust outlet port 20. The feed of silane is decreased and stopped after initial ignition and upon feeding of the liquid fuel to the combustion chamber.

With reference to the FIGURE, the liquid fuel may be fed through a separate line 18 to the combustion zone 12 or, fed through the same line 16 as the silane after ignition in the combustion zone. The feed of silane to the combustion chamber is stopped once the liquid fuel is fed to the combustion zone.

As noted above, the preferred liquid fuel is a kerosene fuel which is generally designated by the Air Force under the designation JP-X and by NASA under the designation RP-X.

The method of the present invention allows for an effective hypergolic fuel system which does not require the employment of expensive catalytic beds as is required in known prior art such as, for example, U.S. Pat. No. 3,488, 962.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A hypergolic fuel system comprising hydrogen peroxide, silane and a liquid fuel.

2. A hypergolic fuel system according to claim 1, wherein the liquid fuel is kerosene.

3. A hypergolic fuel system according to claim 1, wherein the liquid fuel is selected from the group consisting of rocket fuel and jet fuel.

4. A method for producing thrust comprising feeding hydrogen peroxide and silane to a combustion zone in a ratio wherein the hydrogen peroxide decomposes and ignites, and thereafter feeding a liquid fuel to the combustion zone to ignite the fuel to produce thrust.

5. A method according to claim 4, wherein the ratio of hydrogen peroxide to silane is between 1 to 9.

6. A method according to claim 4, including decreasing the feed of silane to the combustion zone and thereafter feeding the liquid fuel.

7. A rocket motor comprising a combustion zone, and means for feeding a hypergolic fuel comprising hydrogen peroxide and silane to the combustion zone in an amount sufficient to ignite the hypergolic fuel.

8. A rocket motor according to claim 7, wherein hydrogen peroxide and silane are fed to the combustion zone under positive pressure in a ratio wherein the hydrogen peroxide decomposes and ignites.

9. A rocket motor according to claim 8, further including means for feeding a liquid fuel to the combustion zone after ignition of the hydrogen peroxide wherein the liquid fuel is ignited in the combustion zone.

10. A rocket motor according to claim 9, further including means for decreasing the feed of silane to the combustion zone prior to feeding the liquid fuel.

* * * * *